Sept. 8, 1970                J. A. H. DELVES                3,526,973
                          CALCULATING INSTRUMENT
                           Filed Feb. 18, 1969

# United States Patent Office 3,526,973
Patented Sept. 8, 1970

3,526,973
CALCULATING INSTRUMENT
James A. H. Delves, Wigston, England, assignor to Brees Plastics Limited, Leicester, England, a British company
Filed Feb. 18, 1969, Ser. No. 800,212
Claims priority, application Great Britain, Feb. 23, 1968, 8,868/68
Int. Cl. G09b *19/02*
U.S. Cl. 35—31     7 Claims

ABSTRACT OF THE DISCLOSURE

Calculating instrument primarily for use in teaching children addition and subtraction of numbers. Comprises a holder having an open-ended guideway for a slide which projects from one end of the latter.

Figure 1:
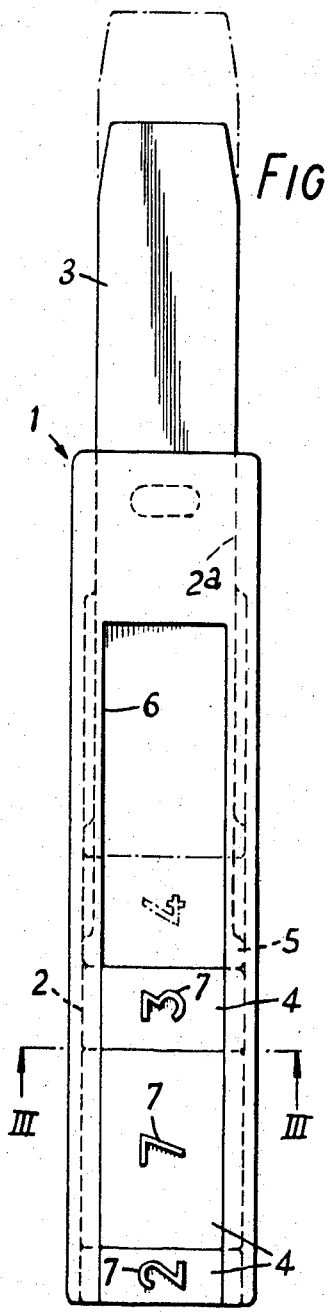

Numbered tablets, each of which is of a length proportional to the number it carries are introduced into the guideway from the end remote from the slide and the latter is moved along the guideway to close tablets up together. The slide carries numbers visible through an aperture in the holder and the number visible when tablets are closed up in the guideway indicates the sum of numbers carried by these tablets.

---

This invention is concerned with manually-operable calculating instruments and has for its object to provide an instrument which is easy to operate and which is particularly suitable for use in performing relatively simple calculations, although there is no limitation in this regard.

According to the invention there is provided a calculating instrument comprising a holder having a guideway to receive a number of calculation tablets, each of which is marked to represent a particular quantity and is of a length proportional to the quantity it represents; and an indicator slide which is moveable along the guideway, markings being provided on the slide and/or on the holder, and the arrangement being such that if one or more tablets are positioned end to end in the guideway and the slide is moved to abut the relevant end-most tablet, the marking displayed or indicated denotes the sum of the quantities represented by the said one or more tablets.

Thus, to use this instrument, all that is necessary is to insert the relevant tablets in the guideway, move the indicator slide along the latter until it abuts the tablets, and read off the sum of the quantities represented by the latter as denoted by the said markings.

Preferably, the guideway is open ended; the indicator slide extending into it from one end and the tablets being inserted from the opposite end.

In any event, the said markings are preferably arranged in a series extending longitudinally of the slide and an aperture is provided in the holder through which they can be individually viewed.

In one embodiment of the invention, the tablets may each be marked with a number; for example, where say, ten tablets are provided, they may be numbered from 1 to 10. Thus, if a plurality of tablets are inserted into the guideway, e.g. those numbered 2, 4 and 6, and the slide is moved along the guideway until it abuts the endmost tablet, the marking on the slide which is visible through the said aperture will indicate the sum of the quantities marked on those tablets, i.e. 12.

The calculating instrument provided by this invention has been developed primarily for educational purposes. Thus, by introducing numbered tablets selected at random into the guideway and observing that this causes a particular number on the slide to appear in said aperture, a child quickly learns to associate the numbers on those tablets with a particular number on the slide. If one tablet is then removed, the child sees the first number on the slide replaced by a second and quickly associates the removal of that tablet with the change of numbers. In this way, addition and subtraction of simple numbers and counting can be quickly learned by a child through its own experiments. Once the child can work with simple numbers, an instrument having higher-numbered tablets can be used.

Other uses of the instrument are to be found in the addition and subtraction of money, areas, volumes, lengths etc. In fact, by appropriately marking the tablets and slide, the instrument may also be adapted for use in currency conversion. In this event, the tablets will be marked in one currency and the slide will be marked in the currency into which it is wished to convert. Addition and subtraction of amounts in the first currency would be automatically converted into the second.

For the sake of convenience, the following further description of the invention will be confined to the use of the instrument in the educational field and more particularly in the addition and subtraction of simple numbers, it being understood that there is no limitation in this.

To facilitate manipulation of the tablets and assist in the learning of numbers by a child, the numbers may be embossed, i.e. raised up from the surfaces of the tablets. Moreover, the latter themselves may be differently coloured so that the child learns to associate a particular number with a certain colour, in accordance with modern teaching methods.

As a further refinement, the undersurfaces of the tablets may be stepped from side to side thereof, the bottom of the guideway being complementary shaped from side to side thereof and throughout its length.

This ensures that a child correctly engages the tablets in the guideway with their numbered faces uppermost and with the numbers the correct way up.

Figure 2:
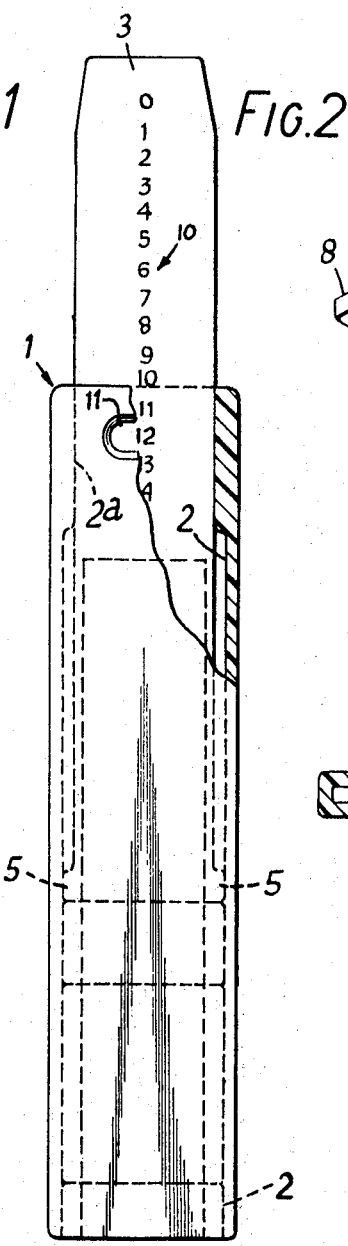
Figure 4:
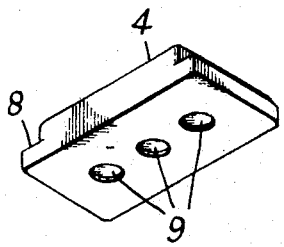
Figure 3:
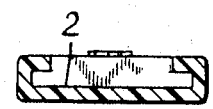

In order that the invention may be more clearly understood and readily carried into practical effect, a specific embodiment thereof will now be described by way of example, with reference to the accompanying drawings, wherein:

FIG. 1 is a view from above of a calculating instrument constructed according to the invention, for use in the teaching of mathematics, FIG. 2 is an underneath view of the instrument of FIG. 1, FIG. 3 is a sectional view on line III—III of FIG. 1, and FIG. 4 shows one of the calculation tablets to be used in the instrument of FIGS. 1 to 3.

The illustrated instrument is made of a plastics material and comprises a holder 1 which has an open-ended guideway 2 formed therethrough. An indicator slide 3 is movable along the guideway 2 and normally projects from one end thereof as shown. Also received in one end of the guideway 2 are a number of calculation tablets 4.

More specifically, the holder 1 is rectangular in plan and in cross-section, with the guideway 2 extending from end to end thereof: the guideway is also rectangular in cross-section (FIG. 3). It will be seen from FIGS. 1 and 2 that the guideway is not of constant width along its length, there being a portion 2a adjacent one end of the holder which is of reduced width compared with the remainder thereof.

Slide 3 is of flat cross-section and, over the majority of its length, is of a width which enables it to slide along the reduced portion 2a of the guideway 2. At its end inside the guideway, slide 3 has a pair of sidewardly-projecting ears 5 which prevent it being withdrawn out of that end of the holder.

A rectangular cut-out 6 is provided in the upper face of the holder 1 to enable the tablets 4 in the guideway 2 to be viewed.

The tablets 4 are rectangular in shape and are each provided with a number designated 7 which is raised up in relief on the upper surface of the tablet. Each tablet is of a length proportional to the number it carries and has a longitudinal rebate 8 along each edge to enable it to fit in the guideway 2. In addition to carrying numerals 7, each tablet has a number of circular depressions 9 on its underside, the number of depressions being equal to the number 7 on the tablet. Thus, in the example shown in FIG. 4, three depressions are provided and the tablet carries the numeral 3 on its upper surface. The tablets can then be used upside-down and slide along the upper surface of the holder with the upper surface of the tablets projecting into the cut-out 6.

A set of ten calculation tablets, numbered from 1 to 10 may be provided for use in the instrument. Preferably, two such sets are provided for each instrument to obtain the maximum advantage therefrom. It will be realised that, as already mentioned, each tablet will be of a length proportional to the number it carries so that the length of any tablet will be equal to the length of the basic number 1 tablet multiplied by the number carried by the tablet concerned. Thus, the number 10 tablet will be ten times the length of the number 1 tablet.

Preferably, the raised numerals 7 on the tablets are each coloured. The colours used may be, from tablet number 1 to tablet number 10: Ivory, yellow, pink, pale blue, light green, orange, dark green, dark blue, crimson, black.

As can be seen from FIG. 2, a longitudinally-extending series 10 of numbers is provided on the rear of the slide 3 for viewing through an aperture 11 in the rear of the holder 1. The series is so arranged that, in use, a number of tablets 4 are inserted in the end of guideway 2 remote from slide 3 and the latter is moved to close the tablets up together so that one of the end-most tablets is flush with the end of the holder 1 and the other end tablet is in contact with the slide 3. At this time, the number appearing in the aperture 11 is equal to the sum of the numbers on the tablets 4, in the guideway 2 at that time.

A child using the instrument, having inserted the selected tablets in the guideway 2, simply places the holder 1 on a surface with its tablet-receiving end down to close up the tablets 4 together. He or she then reads off the sum of the tablets from the aperture in the rear of the holder. Subtraction of numbers can be easily demonstrated by removing the desired tablet and observing the fresh number which appears in aperture 11.

I claim:

1. A calculating instrument comprising a holder; a guideway in the holder; a number of calculation tablets for insertion in said guideway, each tablet being marked to represent a particular quantity and being of a length proportioned to the quantity it represents: an indicator slide which is movable along the guideway: and markings on the slide and/or on the said holder arranged so that if one or more tablets are suitably positioned end to end in the guideway and the slide is moved to abut the relevant end-most tablet, the marking indicated denotes the sum of the quantities represented by the said one or more tablets.

2. An instrument according to claim 1, wherein the guideway is open ended, the indicator slide extending into it from one and the tablets being inserted from the opposite end.

3. An instrument according to claim 1, wherein the said markings are arranged in a series extending longitudinally of the slide and an aperture is provided in the holder through which they can be individually viewed.

4. An instrument according to claim 1 wherein the guideway in the holder is open at its upper side so that the markings on the tablets are visible.

5. An instrument according to claim 1, wherein each tablet carries, in relief, a marking which denotes the quantity it represents.

6. An instrument according to claim 5, wherein the markings are numbers which are differently-coloured.

7. An instrument according to claim 6, wherein each tablet has, in its underside, a number of depressions equal to the number represented by the tablet.

References Cited

UNITED STATES PATENTS

| 1,183,570 | 5/1916 | Kneeshaw | 35—75 |
| 1,594,376 | 8/1926 | Passmore | 35—70 |
| 2,486,260 | 10/1949 | Church | 35—31 |
| 2,899,757 | 8/1959 | Webb | 35—32 |
| 3,410,002 | 11/1968 | Mulholland et al. | 35—31 |

STEPHEN J. TOMSKY, Primary Examiner

U.S. Cl. X.R.

235—123